(12) United States Patent
Glover

(10) Patent No.: US 9,569,871 B2
(45) Date of Patent: Feb. 14, 2017

(54) VISUALIZATION OF RELATIONSHIPS AND STRENGTHS BETWEEN DATA NODES

(71) Applicant: International Business Machines Corporation, Armonk, NY (US)

(72) Inventor: Raymond S. Glover, Cambridge (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/055,925

(22) Filed: Feb. 29, 2016

(65) Prior Publication Data

US 2016/0171732 A1    Jun. 16, 2016

Related U.S. Application Data

(63) Continuation of application No. 14/513,260, filed on Oct. 14, 2014.

(51) Int. Cl.
| | | |
|---|---|---|
| *G06F 17/30* | (2006.01) | |
| *G06T 11/20* | (2006.01) | |
| *G06N 5/02* | (2006.01) | |
| *G06T 13/80* | (2011.01) | |

(52) U.S. Cl.
CPC ....... *G06T 11/206* (2013.01); *G06F 17/30554* (2013.01); *G06F 17/30994* (2013.01); *G06N 5/022* (2013.01); *G06T 13/80* (2013.01)

(58) Field of Classification Search
None
See application file for complete search history.

(56) References Cited

U.S. PATENT DOCUMENTS

| 8,605,089 B1 | 12/2013 | Heckerman et al. |
| 8,639,695 B1 | 1/2014 | Spielthenner |
| 9,373,078 B1* | 6/2016 | Olsson ............... G06N 5/02 |
| 2007/0208498 A1* | 9/2007 | Barker ............. G08G 1/0104 |
| | | 701/117 |

(Continued)

FOREIGN PATENT DOCUMENTS

| JP | 2007249641 A | 9/2007 |
| JP | 2012099002 A | 5/2012 |

OTHER PUBLICATIONS

Forrester et al., "graphael: A System for Generalized Force-Directed Layouts", This work is partially supported by the NSF under grant ACR-02229290, Department of Computer Science, University of Arizona, provided in Disclosure on Jun. 17, 2014, <http://graphael.cs.arizona.edu/>.

McIntire et al., "Visualizing Weighted Networks: A Performance Comparison of Adjacency Matrices versus Node-link Diagrams", Ground/Air Multisensor Interoperability, Integration, and Networking for Persistent ISR III, edited by Tien Pham, Proc. of SPIE, vol. 8389, 83891G, © 2012 SPIE, CCC code: 0277-786X/12, doi: 10.1117/12.920012 http://proceedings.spiedigitallibrary.org/ on Aug. 8, 2014, Terms of Use: http://spiedl.org/terms.

(Continued)

*Primary Examiner* — Charles Adams
(74) *Attorney, Agent, or Firm* — Adolph Bohnstedt

(57) ABSTRACT

One or more processors receive a dataset that includes a plurality of nodes. One or more processors identify relationships between a plurality of interacting nodes within the dataset. One or more processors determine relationship strength values between a plurality of interacting node pairs within the dataset. One or more processors generate a graphical representation that represents the relationship strength values between the plurality of interacting nodes within the dataset. Interacting node pairs are connected by edges and the edges have a length that correlates with the relationship strength value between the interacting node pairs.

1 Claim, 5 Drawing Sheets

(56) References Cited

U.S. PATENT DOCUMENTS

| | | | |
|---|---|---|---|
| 2011/0289207 A1* | 11/2011 | Liu | H04L 41/22 709/224 |
| 2011/0289443 A1* | 11/2011 | Heaven | G06Q 10/06398 715/772 |
| 2012/0268467 A1 | 10/2012 | Madden et al. | |
| 2014/0101557 A1 | 4/2014 | Kelly | |
| 2015/0170060 A1* | 6/2015 | Blechner | G06Q 10/02 705/5 |
| 2016/0019661 A1* | 1/2016 | Bouganim | G06Q 30/01 705/319 |
| 2016/0026738 A1* | 1/2016 | Gou | G06F 17/5009 703/2 |
| 2016/0103933 A1 | 4/2016 | Glover | |

OTHER PUBLICATIONS

Overton et al., "Visualizing Relationships and Connections in Complex Data Using Network Diagrams in SAS® Visual Analytics", Paper 3323-2015, SAS Global Forum, Apr. 28, 2015, 15 pages.

Schneiderman et al., "Network Visualization by Semantic Substrates", IEEE Transactions on Visualization and Computer Graphics, vol. 12, No. 5, Sep./Oct. 2006, pp. 733-740, © 2006 IEEE, Published by the IEEE Computer Society.

Appendix P.: List of IBM Patents or Patent Application Treated as Related, 2 pages.

\* cited by examiner

… (1) …

VISUALIZATION OF RELATIONSHIPS AND STRENGTHS BETWEEN DATA NODES

BACKGROUND OF THE INVENTION

The present invention relates generally to the field of data analysis, and more particularly to the visualization of relationship strengths over time.

Data visualization is a modern branch of descriptive statistics. It involves the creation and study of the visual representation of data. The main goal of data visualization is to communicate information clearly and effectively through graphical means. This goal becomes more challenging as datasets become larger. Such challenges are often encountered by organizations that analyze extremely large datasets, such as data containing financial records, email correspondence, and social networks. To visualize such large amounts of data, these organizations often require graphical tools to generate visual models of the data that are intuitively understandable for users.

SUMMARY

Embodiments of the present invention provide a method, system, and program product for visualizing relationships and relationship strengths of data. One or more processors receive a dataset that includes a plurality of nodes. One or more processors identify relationships between a plurality of interacting nodes within the dataset. One or more processors determine relationship strength values between a plurality of interacting node pairs within the dataset. One or more processors generate a graphical representation that represents the relationship strength values between the plurality of interacting nodes within the dataset, wherein interacting node pairs are connected by edges and the edges have a length that correlates with the relationship strength value between the interacting node pairs. One or more processors count a number of interactions between interacting node pairs. One or more processors increase the relationship strength value based, at least in part, on each interaction counted. One or more processors generate an animation showing a change in relationship strength over time using a plurality of graphical representations that represent a specified time period. One or more processors predict a future relationship strength value for at least one of the interacting node pairs. One or more processors provide a degree of confidence value for the future relationship strength value based, at least in part, on a statistical analysis of data included in the dataset. One or more processors generate a graphical representation that includes a visualization of one or both of trends and patterns in a change of relationship strength between interacting nodes. One or more processors generate the graphical representations using a modified force-directed algorithm. One or more processors generate the graphical representations using a separate layout algorithm.

DETAILED DESCRIPTION

Force-directed graph drawing algorithms assign forces among the set of edges and the set of nodes of a graph drawing. Typically, spring-like attractive forces based on Hooke's law are used to attract pairs of endpoints of the graph's edges towards each other, while simultaneously repulsive forces like those of electrically charged particles based on Coulomb's law are used to separate all pairs of nodes. In equilibrium states for this system of forces, the edges tend to have uniform length.

Embodiments of the present invention provide a visualizing graphical tool that represents an improvement in the field of large-data analytics. Embodiments of the present invention recognize that extremely large datasets are difficult to visualize with current force-directed algorithms. Embodiments of the present invention provide intuitive visualization of data by correlating data relationship strength with the positioning of graph vertices representing that data. Embodiments of the present invention recognize that the length of graph edges will impart important visual meaning to large datasets. Embodiments of the present invention provide an approach to visualize endlessly growing datasets involving related data points. Embodiments of the present invention visually animate the change in relationship strengths between data points in large datasets over time.

The present invention will now be described in detail with reference to the Figures.

Figure 1:
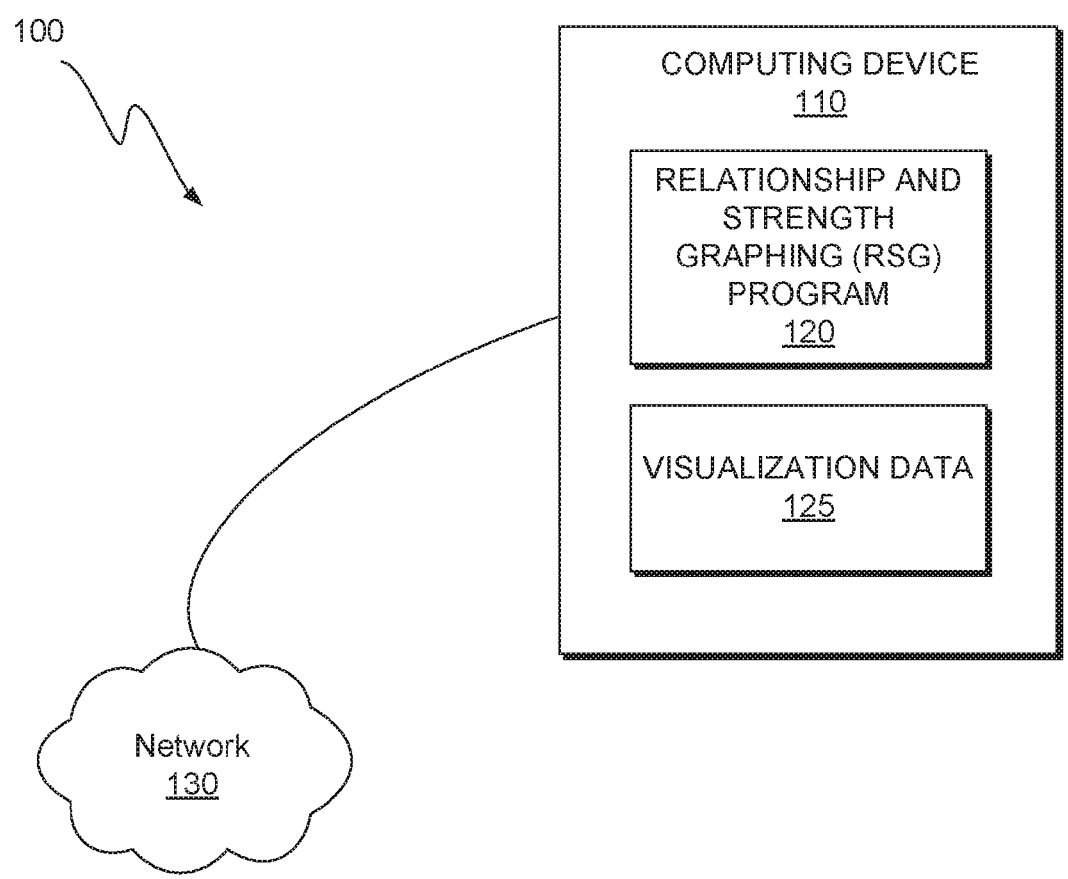
FIG. 1 is a functional block diagram illustrating a data analysis environment, in accordance with an exemplary embodiment of the present invention.

FIG. 1 is a functional block diagram illustrating a data analysis environment, generally designated 100, in accordance with one embodiment of the present invention. Data analysis environment 100 includes computing device 110 connected over network 130. Computing device 110 includes relationship and strength graphing (RSG) program 120 and visualization data 125.

In various embodiments of the present invention, computing device 110 is a computing device that can be a standalone device, a server, a laptop computer, a tablet computer, a netbook computer, a personal computer (PC), or a desktop computer. In another embodiment, computing device 110 represents a computing system utilizing clustered computers and components to act as a single pool of seamless resources. In general, computing device 110 can be any computing device or a combination of devices with access to RSG program 120 and visualization data 125 and is capable of executing RSG program 120. Computing device 110 may include internal and external hardware components, as depicted and described in further detail with respect to FIG. 5.

In this exemplary embodiment, RSG program 120 and visualization data 125 are stored on computing device 110. However, in other embodiments, RSG program 120 and visualization data 125 may be stored externally and accessed through a communication network, such as network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between computing device 110, RSG program 120, and visualization data 125, in accordance with a desired embodiment of the present invention.

In an embodiment, visualization data 125 is any data capable of being visually expressed in graphs containing nodes with edges connecting the nodes, where the relationships between the nodes are of varying strengths. In one embodiment, the graph is a directed graph. In yet another embodiment, the graph is an undirected graph. An individual data record for visualization data 125 requires labels for the nodes and a strength-of-relationship value between nodes that are connected by edges. Example embodiments of visualization data 125 include emails, social networks, and even financial transactions. In the case of emails, example embodiments for nodes are email sender and receiver. Other example embodiments for nodes are locations. For example, money wired from London to New York is visualized as two nodes labeled "London" and "New York". The strength-of-relationship value shows the importance of the individual record or transaction. The strength-of-relationship value is a numeric value that is assigned or calculated. In one embodiment, the importance that was assigned to an email by the sender is given a certain strength-of-relationship value. For example, an email of high importance is given a value of "1" while two other emails that were of medium and low importance are given values of "0.67" and "0.33", respectively. In another embodiment, the number of emails exchanged between a given pair of individuals is used to calculate the importance of their relationship. For example, ten emails exchanged between two parties in a given week shows a stronger relationship than two emails exchanged in the same week. In yet another embodiment, both the frequency and assigned importance of a transaction is combined to create a strength-of-relationship value.

In exemplary embodiments, RSG program 120 creates graphs that indicate strength of relationship between nodes by varying the length of the edges that connect them. In one embodiment, RSG program 120 shows the resulting graph in a static mode. In another embodiment, RSG program 120 shows the resulting graph in an animated display. In one embodiment, RSG program 120 utilizes a modified force-directed algorithm. In another embodiment, a separate layout algorithm that uses a constraint-based gradual displacement of nodes is employed.

Figure 2:
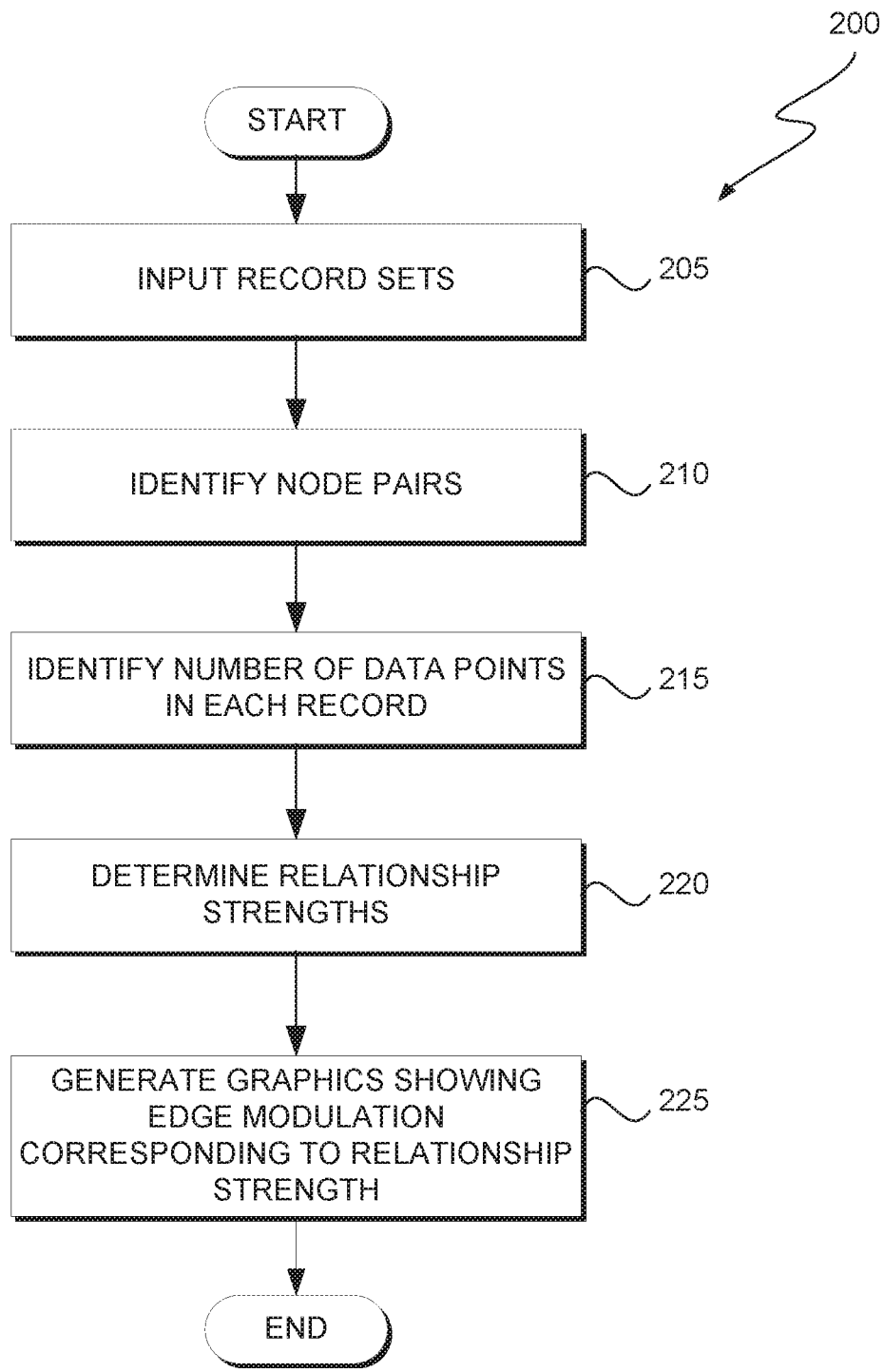
FIG. 2 illustrates operational processes of a relationship and strength graphing (RSG) program, executing on a computing device within the environment of FIG. 1, in accordance with an exemplary embodiment of the present invention.

FIG. 2 illustrates operational processes, 200, of RSG program 120, executing on computing device 110 within data analysis environment 100, in accordance with an exemplary embodiment of the present invention. In one embodiment, RSG program 120 receives data in the form of record sets in step 205. The record sets could be, for example, transactional data such as emails, financial records, and social networks. In step 210, RSG program 120 identifies the transactional record's nodes. As mentioned above, RSG program 120 identifies email sender and receiver as node labels in one example. In another example, transactional data between two different locations would label the nodes with those location names.

In steps 215 and 220, RSG program 120 identifies the total number of data points in the record and determines relationship strength, respectively. For example, some transactional records may be 3-tuples, which have two nodes and a value for strength-of relationship. An example of a 3-tuple record would be an email record which includes a sender, receiver, and a numeric level of importance. The sender would be one node, the receiver would be a second node, and the numeric level of importance would be the strength-of-relationship. Embodiments of the present invention also accommodate records that contain more than three data points. For example, email records that include sender, receiver, numeric level of importance, and a number of emails exchanged would be a 4-tuple record. In this embodiment, the sender and receiver are again nodes, but the numeric level of importance would be combined with the number of emails to generate a strength-of-relationship value. In one embodiment, the strength-of-relationship value is an expression of average strength. In another embodiment, the strength-of-relationship value the overall sum of combined strength.

In step 225 RSG program 120 generates a graph with nodes connected by edges of varying lengths. The edge lengths correlate with and provide a visualization of relationship strength. An exemplary embodiment shows edge length becoming shorter as relationship strength becomes stronger. The average strength-of-relationship ($s_{avg}$) of the records is determined and used in the following equation:

$$l(e_i) = L \cdot \frac{1.0}{0.5 + e^{-(5 \cdot (s_i - s_{avg}))}} \quad (1)$$

Where $l(e_i)$ is the edge length for any graph edge corresponding to record i; L is a scaling factor specific to the visualization and chosen by the user; and $s_i$ is the numeric strength-of-relationship for any record i. RSG program 120 generates an output graph where the lengths of the edges connecting related node pairs is based on the relative strength of their relationships as determined in Equation 1 above.

In another exemplary embodiment of step 225, RSG program 120 depicts animation showing how relationship strengths between nodes change over time for a given time window. In this embodiment, the change of edge length, $d(e_i)$, is calculated by the following equation:

$$d(e_i) = \left(\frac{s_i - s_{avg}}{|s_i - s_{avg}|}\right) \frac{L}{2} \sqrt{|s_i - s_{avg}|} \quad (2)$$

Where $l(e_i)$ is the edge length for any graph edge corresponding to record i; L is a scaling factor specific to the visualization and chosen by the user; and $s_i$ is the numeric strength-of-relationship for any record i. Using equation 2, RSG program 120 incrementally shows the stretching and contracting of edge lengths for user-defined time increments within the time window.

Figure 3:
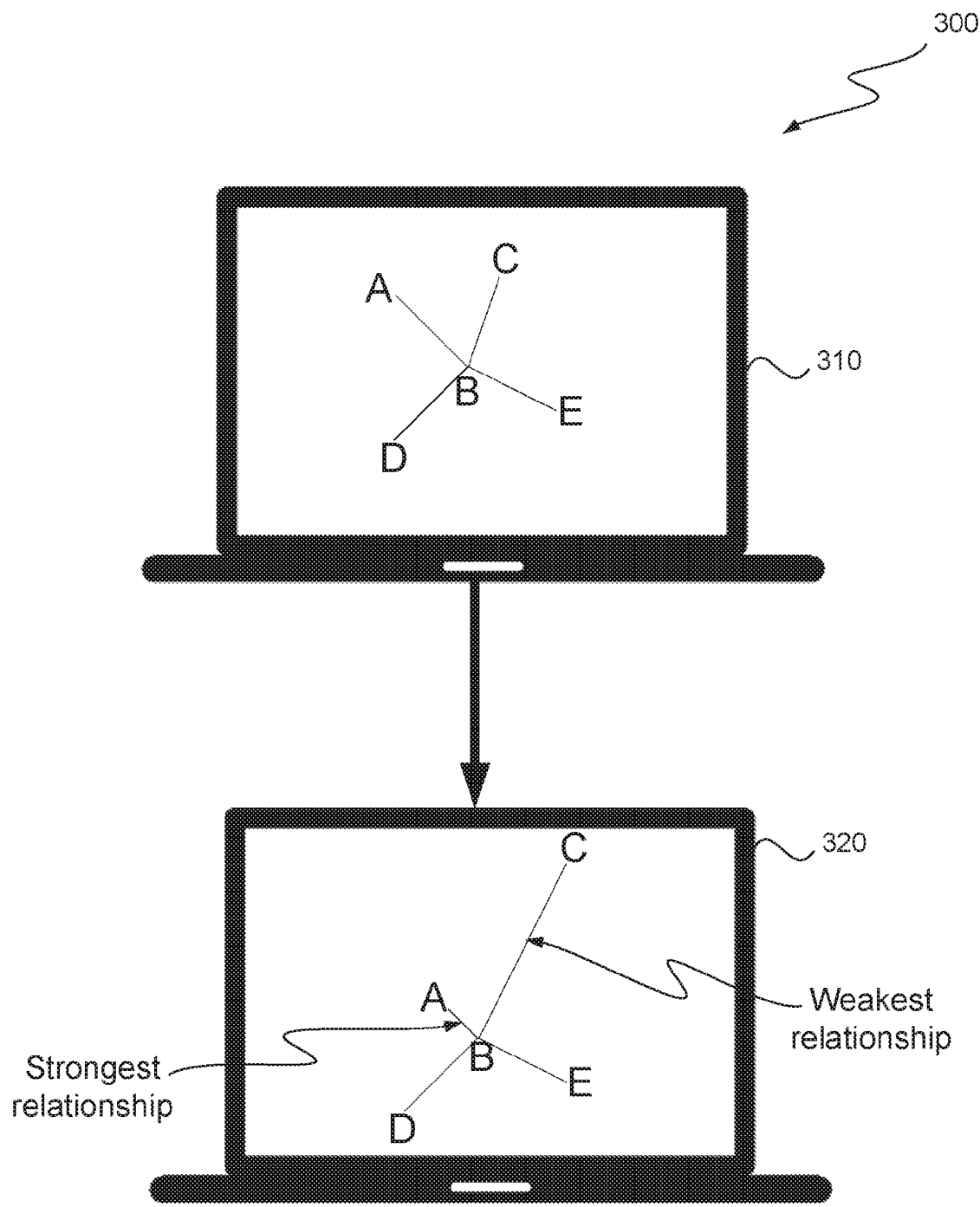
FIGS. 3 and 4 are pictorial representations illustrating an end-user utilizing exemplary embodiments of the invention.

FIG. 3 shows an exemplary embodiment, 300, of the present invention. FIG. 3 displays one example of the graphics disclosed in step 225 of FIG. 2. The example in FIG. 3 shows the effect of visualizing relationship strengths for a four edge set, {AB, BC, BD, BE}, representing five nodes and four records. Screenshot 310 shows a force-directed graph wherein relationship strength has not been calculated for the record set and relationship strength is therefore unknown. Screenshot 320 shows a graph generated by RSG program 120 showing the strengths between the nodes using edge length. The relationship between nodes A and B are the strongest and the one between B and C is the weakest. The BD and BE relationships are roughly equal and in-between AB and BC in terms of strength.

In one embodiment, visualization of the animation allows trends to be identified. For example, relationships between nodes are visualized to have a cyclic or perhaps a seasonal nature of strengthening and weakening when viewed over an extended period of time. In yet another embodiment, visualization of the animation allows predictions of future relationship strengths to be estimated or calculated. For example, relationship strength between business associates exchanging emails are predicted to increase or decrease towards the end of a quarter or fiscal year.

Figure 4:
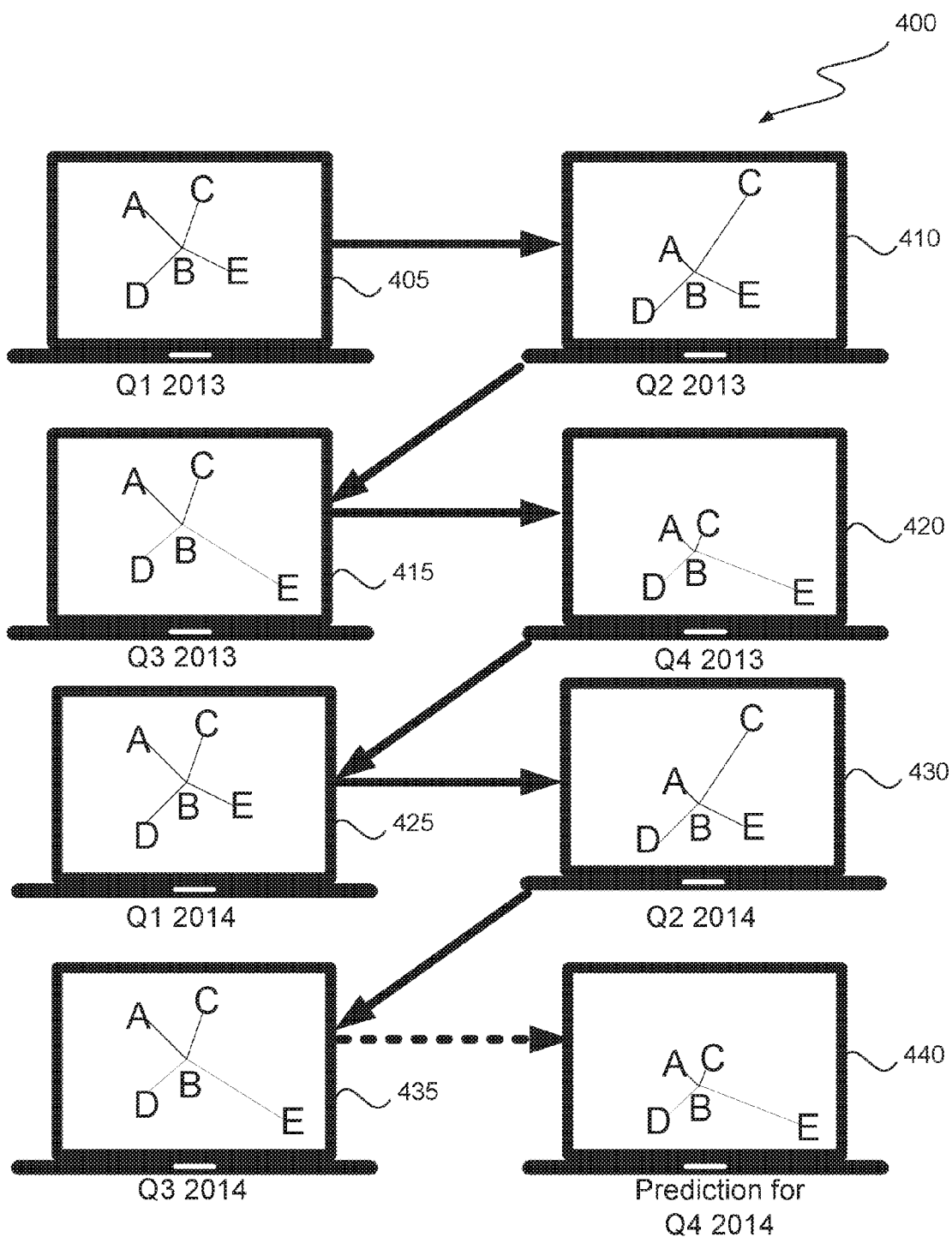

An example of trend-spotting over time is seen in embodiment 400 shown in FIG. 4. In this example of an animated graph, the relationship strength is visualized over the course of a nearly two years in quarterly windows between data points A, B, C, D, and E. Screenshot 405 shows that relationships AB, BC, BD, and BE are similar in strength between Jan. 1 and Mar. 31, 2013 (Q1 2013). Between April $1^{st}$ and June 30th (screenshot 410, Q2 2013), the AB relationship is stronger than in Q1 2013, the BC relationship strength is weaker while BD and BE do not appear to have changed at all. Between July $1^{st}$ and September 30th (screenshot 415, Q3 2013), the BC and AB relationships are similar to their strengths in Q1, BD remains unchanged and BE has is weaker than any previous quarter. By the end of the year (screenshot 420, Q4 2013), AB appears to be as strong as its Q2 strength, which is similar in strength to the relationship strength between B and C. The BD and BE strengths are similar to Q3 2013.

Examination of the first three quarters of 2014 (screenshots 425, 430, and 435) show an analogous trend of strength values for the four relationships. Q1 2014 (screenshot 425) appears quite similar to Q1 2013 (screenshot 405), Q2 2014 (screenshot 430) appears almost identical to Q2 2013 (screenshot 410), and Q3 2014 (screenshot 435) closely mirrors Q3 2013 (screenshot 415). This leads to the prediction that Q4 2014 will mimic what was observed for Q4 2013. Thus, the user predicts screenshot 440 will be the graph seen for Q4 2014 because it is identical to the graph seen for Q4 2013 (screenshot 420).

In some embodiments, RSG program 120 includes statistical sub-programs that provide RSG program 120 with the functionality to perform various statistical analysis operations on data. For example, in FIG. 4, RSG program 120 uses such a sub-program to identify the trends, patterns etc. in the changes in strength between nodes A, B, C, D and E. RSG program 120 then uses that sub-program to predict what the future strength will be between those nodes (shown in screenshot 440). In some embodiments, such an analysis and prediction include a degree of confidence based on how far into the future the prediction is determined. For example, if the data that is analyzed spans eight years with five hundred data-points and the prediction is for a point that is three months into the future, then the degree of confidence is "high". In certain embodiments, the difference between the time period over which data is gathered and the time span between the last data point and the time of the prediction impacts the degree of confidence associated with a prediction. In continuation with the previous example, a prediction for a point that is three years into the future would yield a degree of confidence is "low" because the degree of confidence decreases the father into the future the prediction is made and the data was only gathered over eight years. In other embodiments, the number of data-points impacts the degree of confidence associated with a prediction. Like most forms of statistical analysis, a larger number of data points over a given time period increases the degree of confidence associated with a prediction, at least to a point.

Figure 5:
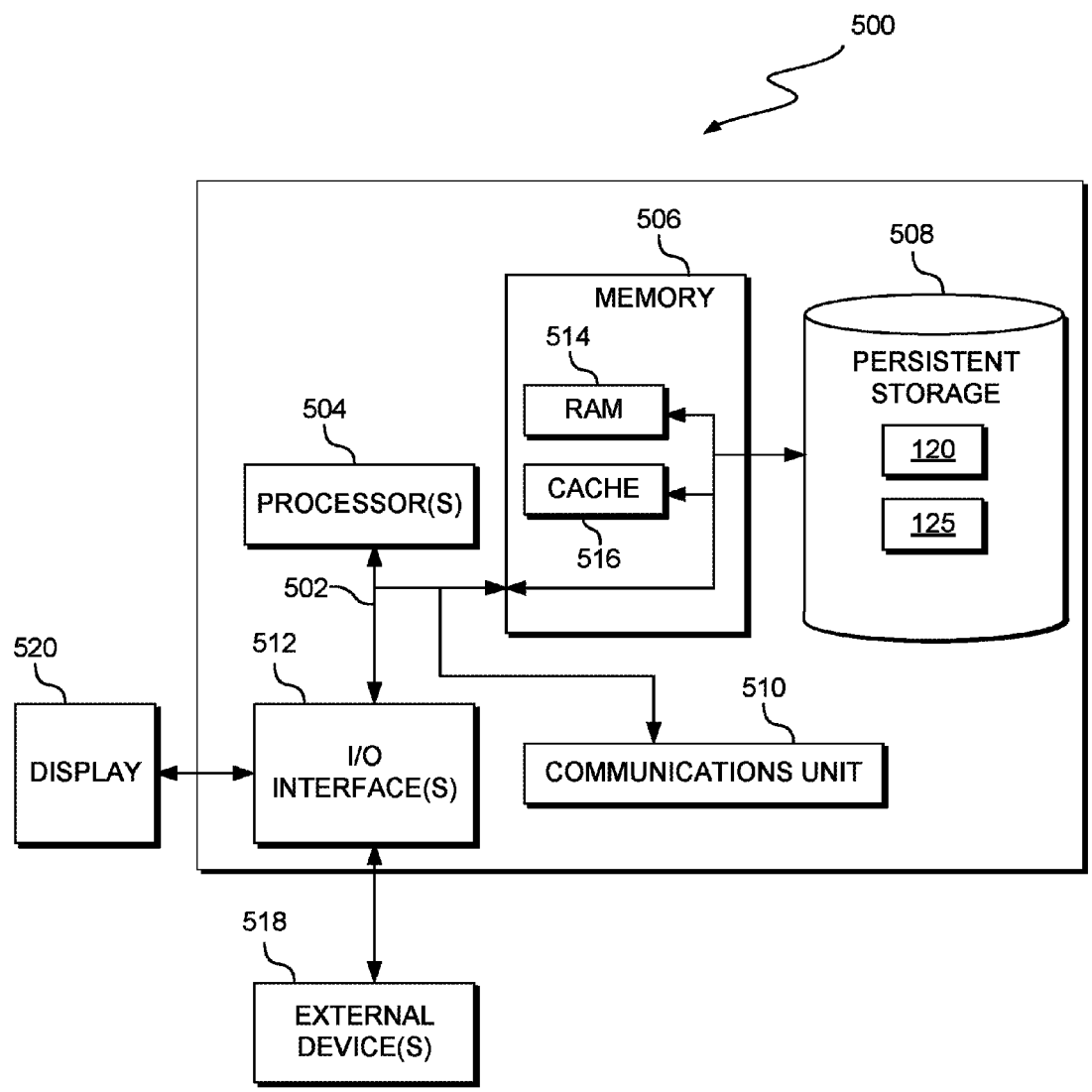
FIG. 5 depicts a block diagram of components of the computing device executing the RSG program, in accordance with an exemplary embodiment of the present invention.

FIG. 5 depicts a block diagram, 500, of components of computing device 100, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing device 110 includes communications fabric 502, which provides communications between computer processor(s) 504, memory 506, persistent storage 508, communications unit 510, and input/output (I/O) interface(s) 512. In one embodiment, communications fabric 502 is implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Visualization data 125, and RSG program 120 are stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of network 130. In these examples, communications unit 510 includes one or more network interface cards. Communications unit 510 may provide communications through the use of either or both physical and wireless communications links. Visualization data 125, and RSG program 120 may be downloaded to persistent storage 508 through communications unit 510.

I/O interface(s) 512 allows for input and output of data with other devices that may be connected to computing device 110. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., Visualization data 125, and RSG program 120, can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

What is claimed is:

1. A method for visualizing relationships and relationship strengths of data comprising:
  receiving, by one or more processors, a dataset that includes a plurality of nodes;
  identifying, by one or more processors, relationships between a plurality of interacting nodes within the dataset;
  determining, by one or more processors, relationship strength values between a plurality of interacting node pairs within the dataset;
  generating, by one or more processors, a graphical representation that represents the relationship strength values between the plurality of interacting nodes within the dataset, wherein interacting node pairs are connected by edges, wherein the edges have a length that correlates with the relationship strength value between the interacting node pairs, and wherein a calculation to determine the length of the edges includes an equation:

$$l(e_i) = L \cdot \frac{1.0}{0.5 + e^{-(5 \cdot (s_i - s_{avg}))}}$$

where $l(e_i)$ is the length of the edges corresponding to a record i; L is a scaling factor specific to a visualization and chosen by a user; $s_i$ is a numeric strength-of-relationship for the record i; and $s_{avg}$ is an average numeric strength-of-relationship;

counting, by one or more processors, a number of interactions between interacting node pairs;
  increasing, by one or more processors, the relationship strength value based, at least in part, on each interaction counted;
  generating, by one or more processors, an animation showing a change in relationship strength over time using a plurality of graphical representations of graphs that represent a specified time period, wherein one or more distances between two or more nodes visually changes over time in the animation;
  predicting, by one or more processors, a future relationship strength value for at least one of the interacting node pairs;
  providing, by one or more processors, a degree of confidence value for the future relationship strength value based, at least in part, on a statistical analysis of data included in the dataset;
  generating, by one or more processors, a graphical representation that includes a visualization of one or both of trends and patterns in a change of relationship strength between interacting nodes; and
  generating, by one or more processors, the graphical representations using a modified force-directed algorithm or a separate layout algorithm.

\* \* \* \* \*